Oct. 17, 1967
R. J. DONOGHUE
3,347,420
MULTI-COMPARTMENT CONTAINER FOR DISPENSING MEASURED
QUANTITIES OF A PLURALITY OF LIQUIDS
Filed Aug. 16, 1965
3 Sheets-Sheet 1
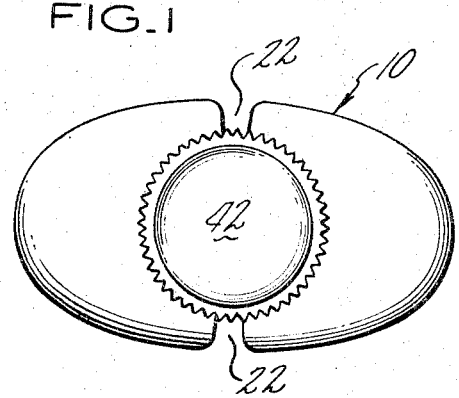
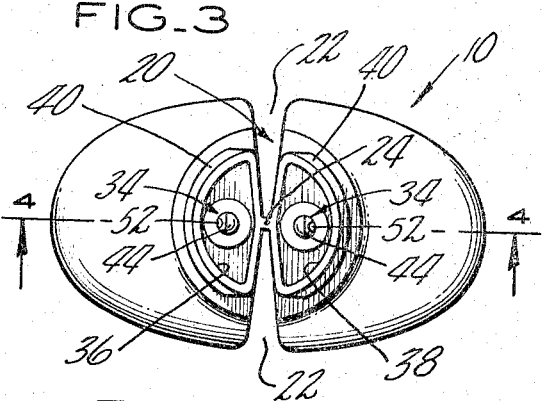
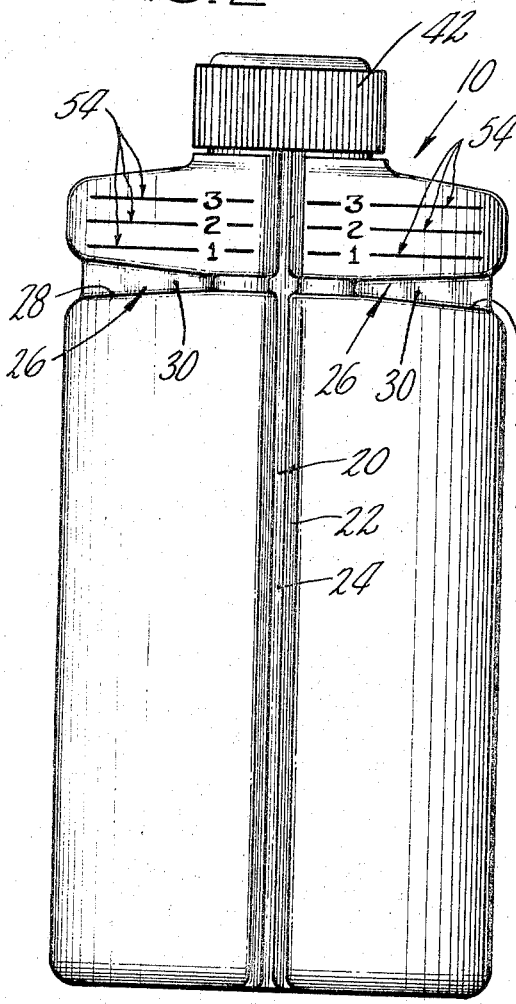
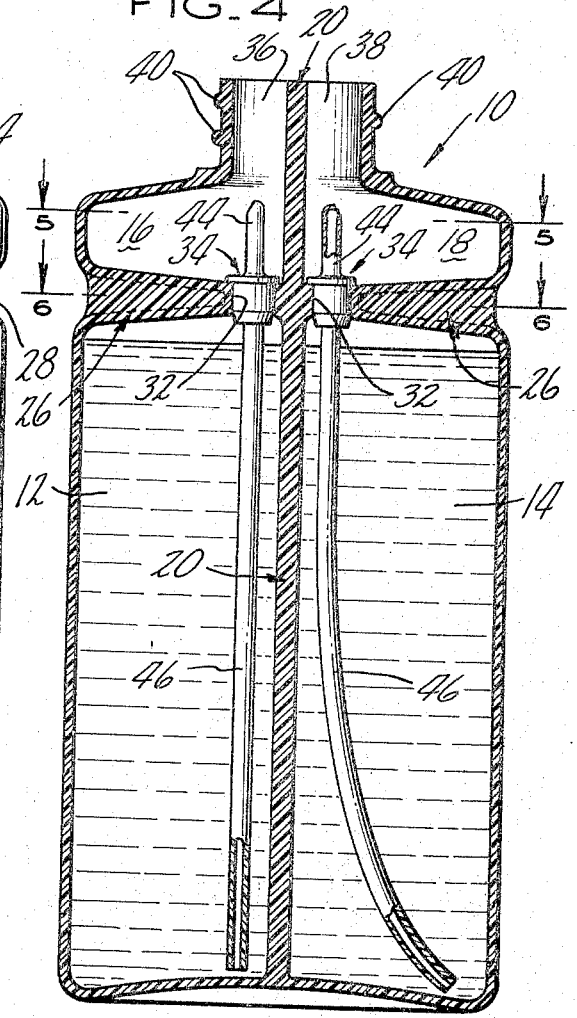
INVENTOR
ROBERT J. DONOGHUE Oct. 17, 1967 R. J. DONOGHUE 3,347,420
MULTI-COMPARTMENT CONTAINER FOR DISPENSING MEASURED
QUANTITIES OF A PLURALITY OF LIQUIDS
Filed Aug. 16, 1965
3 Sheets-Sheet 2
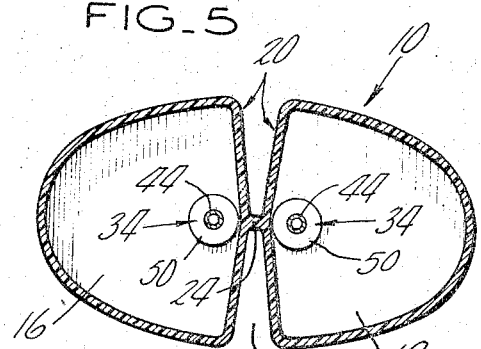
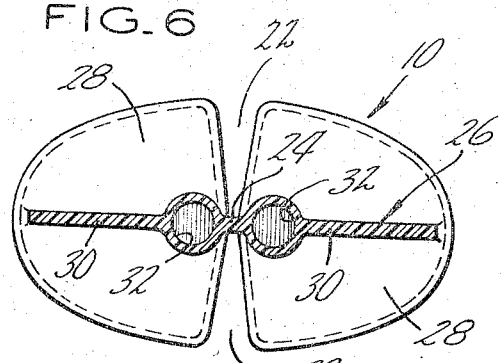
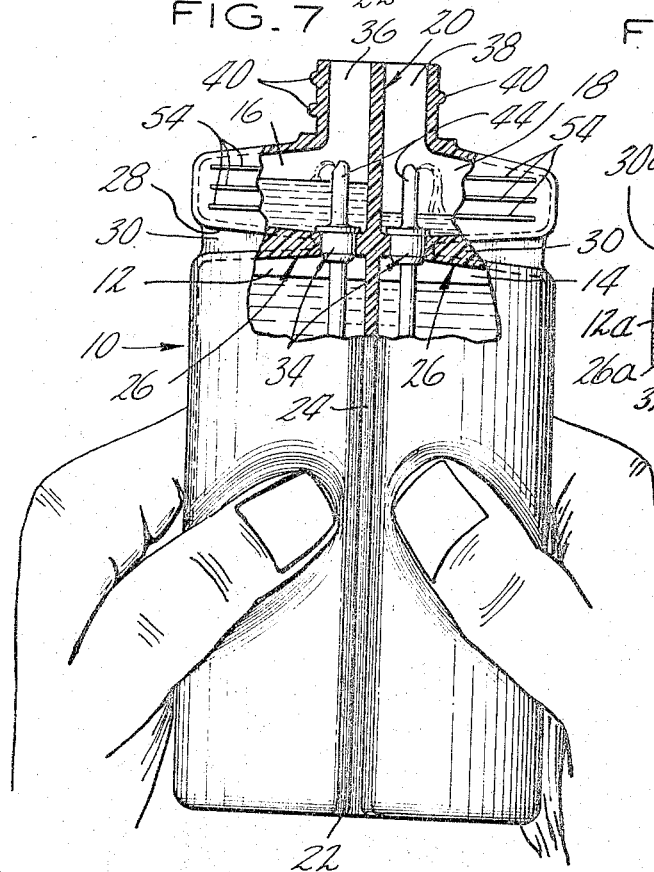
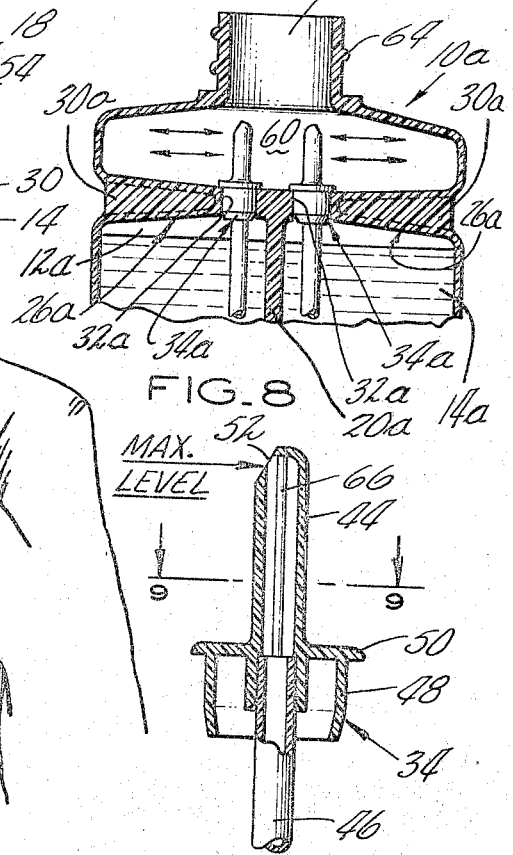
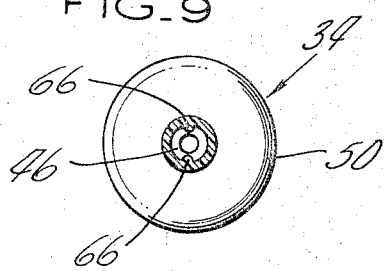
INVENTOR
ROBERT J. DONOGHUE Oct. 17, 1967  R. J. DONOGHUE  3,347,420
MULTI-COMPARTMENT CONTAINER FOR DISPENSING MEASURED
QUANTITIES OF A PLURALITY OF LIQUIDS
Filed Aug. 16, 1965

INVENTOR
ROBERT J. DONOGHUE

United States Patent Office 3,347,420
Patented Oct. 17, 1967

3,347,420
MULTI-COMPARTMENT CONTAINER FOR DISPENSING MEASURED QUANTITIES OF A PLURALITY OF LIQUIDS
Robert J. Donoghue, 900 Windsor Ave., Windsor, Conn. 06095
Filed Aug. 16, 1965, Ser. No. 479,723
11 Claims. (Cl. 222—129)

This invention relates to a flexible wall or "squeeze bottle" type container having a plurality of compartments adapted to contain a plurality of different liquids and to dispense these liquids in measured quantities.

It is the general object of the inevention to provide a single container for a plurality of liquids which are generally used together (as for example, salad oil and vinegar), but which are preferably kept separated until they are used, the container being adapted to dispense measured or selected quantities of each liquid.

It is a more specific object of the invention to provide a container of the aforementioned character which can be economically fabricated of light-transmitting moldable plastic material so as to provide a container having flexible translucent or transparent walls for observation of the liquid levels within the container. It is ancillary to this object to provide a container which can be formed on known plastic molding machines, as for example, on injection-blow molding machines.

It is a more specific object to provide in one form of the invention a container having a plurality of measuring and dispensing compartments, each having an independent dispensing opening, and wherein all of the dispensing openings are adapted to be closed by a single cap.

A still further object of the invention is to provide a container of the type mentioned having one or more dispensing openings at its top so that the container can be used in high-speed filling equipment adapted to "top load" or fill containers from the top.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a top view of the presently preferred embodiment of a container incorporating the features of this invention;

FIG. 2 is a front elevational view of the container shown in FIG. 1;

FIG. 3 is another top view of the said container, but with the closure cap removed from the dispensing openings;

FIG. 4 is a vertical cross-sectional view of the container taken as indicated by the line 4—4 of FIG. 3;

FIG. 5 is a horizontal cross-sectional view taken through the measuring and dispensing compartments of the container as indicated by the line 5—5 of FIG. 4;

FIG. 6 is a further horizontal sectional view taken through the generally horizontal separating wall between the measuring and dispensing compartments and the reservoir compartments as indicated generally by the line 6—6 of FIG. 4;

FIG. 7 is a further front elevational view of the container shown partly in vertical section for the purpose of illustrating the manner in which liquid is transferred from the reservoir compartments to the measuring and dispensing compartments;

FIG. 8 is a vertical cross-sectional view, on enlarged scale, taken through the transfer spout forming a part of the conduit means for transferring the liquid from a reservoir compartment to a measuring and dispensing compartment;

FIG. 9 is a horizontal sectional view through the transfer spout taken as indicated by the line 9—9 of FIG. 8;

FIG. 10 is a fragmentary vertical sectional view showing the upper portion of an alternative form of container provided in accordance with the present invention;

Figure 11:
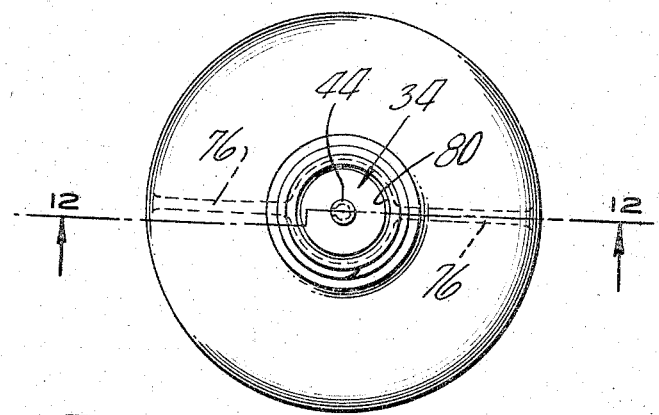
FIG. 11 is a top plan view, with the closure cap removed, of another alternative form of container.

The presently preferred form of container provided in keeping with this invention is indicated generally by the reference numeral 10 in FIGS. 1–7. This container is molded of light-transmitting (preferably translucent) plastic moldable material such as polyethylene or the like to provide a plurality of compartments having relatively thin but sturdy flexible walls. The container 10 is molded or formed to have four integral compartments which comprise two reservoir compartments 12 and 14 and two measuring and dispensing compartments 16 and 18 (FIG. 4).

The two reservoir compartments 12 and 14 are separated from each other and the two measuring and dispensing compartments 16 and 18 are separated from each other by a common generally vertical wall 20 (FIG. 4) which extends throughout the length or height of the container 10. As best shown in FIG. 3, the vertical separating wall 20 has deep vertical grooves 22, 22 extending inwardly from opposite sides of the container to define a web 24 which connects the two reservoirs 12 and 14 to each other and which also connects the two measuring and dispensing compartments 16 and 18 to each other.

As will be more fully understood hereinafter, the reservoir 12 is operatively associated with the measuring and dispensing compartment 16 while the reservoir 14 is associated with the measuring and dispensing compartment 18. The said reservoir compartments are located below their associated measuring and dispensing compartments and are separated therefrom by a generally horizontal wall 26. The said horizontal separating wall is provided with deep, generally horizontal grooves 28, 28 extending from opposite sides of the container 10 so that the reservoirs are connected to the dispensing and measuring compartments by a web 30 (FIG. 6). The generally horizontal wall 26 is also provided with an opening 32 on each side of the vertical separating wall 20 to accommodate a conduit means 34 in each such opening.

As is best shown in FIGS. 3 and 4, the measuring and dispensing compartment 16 is provided with a dispensing opening 36 and the measuring and dispensing compartment 18 is provided with a similar dispensing opening 38. These dispensing openings are located over the openings 32, 32 in the horizontal wall 26 to provide for filling of the reservoirs 12 and 14 from the top, i.e. through the said dispensing openings.

It will be seen that the dispensing openings 36 and 38 are formed in the top wall of the measuring and dispensing compartments 16 and 18 as segments which are separated by the vertical separating wall 20. These segments are threaded as indicated at 40 to receive a single closure cap 42 of conventional configuration. Thus, the conventional cap 42 closes both dispensing openings 36 and 38 by engaging the upper edge or "finish" thereof which includes the upper edge of the vertical separating wall 20.

The conduit means 34 which is inserted into its opening 32 after its associated reservoir has been filled through the associated dispensing opening includes a transfer spout 44 and an elongated tube 46 which are best shown in FIGS. 4, 8 and 9. The said transfer spout and tube are preferably made of plastic, and it will be seen that the tube 46 is held within the lower end of the transfer spout 44 to project downwardly into its associated reservoir 12 or 14. It will also be seen that each spout 44 (FIG. 8) is provided with a diametrically enlarged lower portion or skirt 48 which fits the opening 32 in the horizontal separating wall 26 with which it is associated. A shoulder 50 is provided at the top of the skirt to engage the top surface of the said horizontal separating wall when the transfer spout 44 is properly positioned in the associated opening 32.

In operation of the container to transfer liquid from a reservoir to an associated measuring and dispensing compartment as illustrated in FIG. 7, the flexible walls of the reservoir are squeezed inwardly whereby to reduce the volume of the reservoir and create pressure therein to force liquid up the transfer tube 46 and the spout 44 into the measuring and dispensing chamber which is associated with the particular reservoir. This operation is performed with the container in an erect position as shown in FIG. 7, and as best shown in FIG. 8, the transfer spout 44 extends upwardly in the measuring and dispensing compartment and has a discharge opening 52 at its upper end which is directed toward the side so that liquid will not spray from the transfer spout out of the associated dispensing opening 36 or 38.

It will be quite apparent that liquid from the reservoir 12 can be transferred to the measuring and dispensing compartment 16 in a measured quantity without reference to any amount being transferred from the reservoir 14 to the measuring and dispensing compartment 18. In each such measuring and dispensing compartment, the total amount of liquid which can be transferred to and retained within such compartment is determined by the liquid level within the compartment at the discharge opening 52 of the associated transfer spout 44. A lesser quantity can be transferred to each such measuring and dispensing compartment and measured therein by observation of the liquid level within the measuring and dispensing compartment with reference to volumetric indicia 54, 54. That is, the plastic material forming the body of the container being light-transmitting so as to be either translucent or transparent, the liquid level within the measuring and dispensing compartments 16 and 18 can be seen from outside and referred to the volumetric indicia 54. After transfer of liquid from a reservoir to a measuring and dispensing compartment has been completed, and when pressure is released upon the walls of the reservoir, a lower pressure will be established within the reservoir to suck excess liquid back into the reservoir. This reduced pressure in the reservoir or reservoirs also permits the transferred liquid to be poured from the dispensing opening 36 or 38 without having any liquid move from the transfer conduit and spout 44 and 46 to the dispensing openings.

Therefore, it will be quite apparent that the container of this invention in the embodiment best shown in FIGS. 1–7 can be used to contain and dispense measured quantities of a plurality of different liquids quite independently of each other. This is a desirable feature when two different liquids are commonly used together but in quantities or proportions which may vary with the user's taste or desire.

It is not always necessary that the liquids be dispensed independently of each other. That is, it may be desirable to mix the liquids just prior to dispensing and use but to contain them before mixture independently of each other. The embodiment of the invention shown in FIG. 10 is particularly adapted for such use. The container 10a shown in FIG. 10 is very much similar to the container shown in FIGS. 1–7. That is, it has two reservoirs 12a and 14a which are separated by a generally vertical separating wall 20a. Also, at the top of the reservoirs there is provided a generally horizontal separating wall 26a formed with cavities or grooves 28a, 28a.

The container 10a differs from the previously described container in that it has only one measuring and dispensing compartment 60. That is, the vertical wall 20a does not extend for the full length of the container 10a. While the measuring and dispensing compartment 60 has two openings 32a, 32a on opposite sides of the vertical separating wall 20a to receive two conduit means 34a, 34a, it has only one dispensing opening 62. This dispensing opening is provided with a thread 64 to receive a common closure cap.

It will be understood that volumetric measuring indicia can be applied to the outer walls of the measuring and dispensing compartment 60 so that liquids can be transferred in known quantity from each of the reservoirs 12a and 14a to the measuring and dispensing compartment. In such measuring and dispensing compartment they are mixed prior to being dispensed through the single dispensing opening 62.

Figure 12:
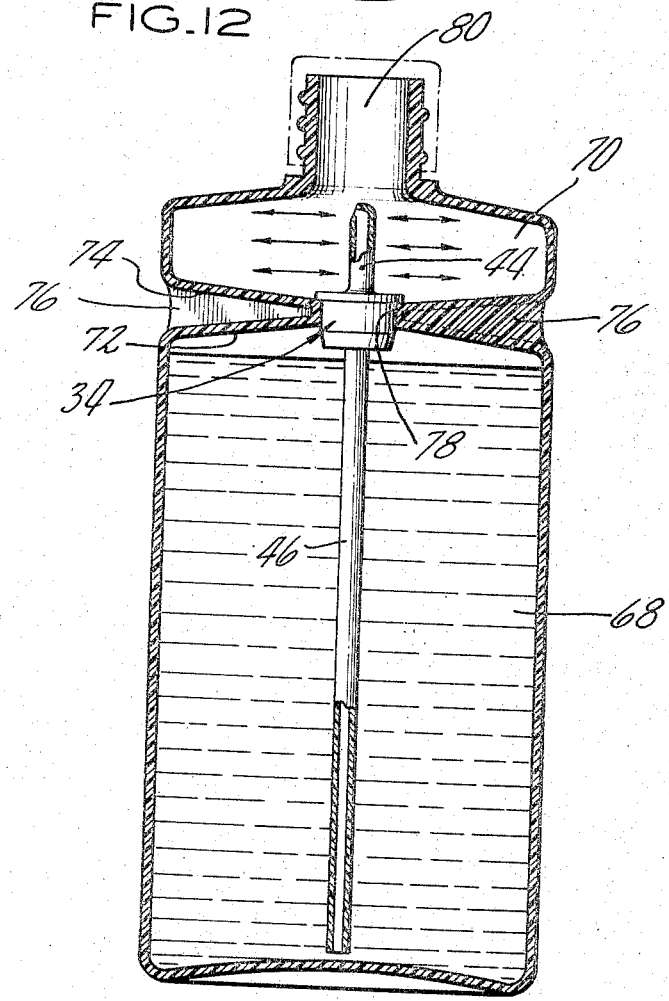
FIG. 12 is a vertical cross-sectional view through the container shown in FIG. 11 as indicated by the line 12—12 of FIG. 11.

The embodiment of the invention shown in FIGS. 11 and 12 is provided to illustrate further the use of the conduit means 34. That is, the said conduit means 34 can be used whether there are a plurality of reservoirs and a plurality of measuring and dispensing compartments or whether there are provided merely a single reservoir and a single measuring and dispensing compartment. In either event, the conduit means 34 is thrust into the opening in the horizontal separating wall which is located below the dispensing opening for the measuring and dispensing compartment. This permits top filling of the reservoir prior to the insertion of the conduit means. It is to be understood that the conduit means comprising the spout 44 and the tube 46 is assembled prior to its insertion. That is, the tube 46 is thrust into the lower end of the spout as illustrated in FIG. 8 so that its bottom end will be adjacent the bottom of the reservoir when it is in place. It will be observed that a rib 66 is molded into the upwardly extending portion of the transfer spout 44 to provide a stop for the upper end of the tube 46. Preferably, there are two such ribs 66, 66 provided as shown in FIG. 9.

In the container embodiment shown in FIGS. 11 and 12 to illustrate more specifically the conduit means 34, there is but a single reservoir 68 provided below a single measuring and dispensing compartment 70. The reservoir and compartment are separated by a generally horizontal separating wall 72 which has a deep annular groove 74 extending therearound except for one diametrical portion which defines a relatively thin web 76. The opening in the horizontal separating wall 72 which receives the conduit means 34 is identified by the reference numeral 78, and it will be observed that this opening is located below the dispensing opening 80 for the measuring and dispensing compartment 70. The dispensing opening 80 is suitably formed with threads or the like to receive a closure cap.

Obviously, the container shown in FIGS. 11 and 12 is not adapted to accommodate a plurality of different liquids. However, it will contain a large supply of a liquid within its reservoir 68 so that this liquid can be transferred to the measuring and dispensing compartment 70 in a measured quantity which can thereafter be dispensed as desired.

The invention claimed is:

1. A container for dispensing measured quantities of different liquids and comprising an integral multi-compartment body formed of flexible wall light-transmitting molded material, two of the said compartments being reservoirs formed with a common generally vertical separating wall which is deeply grooved on opposite sides to connect the two reservoirs by a generally vertical web, at least one other compartment defining a measuring and dispensing chamber formed over the reservoir compartments and having a common generally horizontal separating wall therewith which is provided with an opening on each side of the vertical separating wall to provide communication with the respective reservoirs, the said horizontal separating wall being deeply grooved on opposite sides to connect the two reservoirs to the measuring and dispensing compartment by a generally horizontal web, the said measuring and dispensing compartment being formed with a top wall having a dispensing opening adapted to be closed by a cap and providing access to the openings in the horizontal separating wall for filling the reservoirs, a conduit means for each opening in the horizontal separating wall and insertable therein through the dispensing opening, said conduit means including an upwardly extending transfer spout having a discharge opening at its upper end whereby liquid can be transferred independently from the reservoirs to the measuring and dispensing chamber by squeezing the body walls of the reservoirs and in quantities determined by observing the liquid level in said chamber through the light-transmitting material and in total quantity determined by the liquid level at the discharge openings of said pouring spouts, the transferred liquid being thereafter dispensed from the measuring and dispensing chamber.

2. In a dispensing container of the type having flexible walls defining at least one reservoir and at least one measuring and dispensing compartment over the reservoir and which is separated therefrom by a generally horizontal wall, and wherein the container has a top dispensing opening for the measuring and dispensing compartment, an improved conduit means for transferring liquid from the reservoir to the measuring and dispensing compartment, said conduit means comprising an interconnected elongated tube and transfer spout which can be inserted through the dispensing opening to project the tube through the horizontal separating wall downwardly into the reservoir and with the spout projecting upwardly in the measuring and dispensing compartment, the said spout being formed with a discharge opening directed toward the side at the upper end thereof to prevent liquid being sprayed through the dispensing opening when the walls of the reservoir are squeezed to transfer liquid therefrom to the measuring and dispensing compartment.

3. In a dispensing container of the type having flexible walls defining at least one lower reservoir compartment and at least one measuring and dispensing compartment over the reservoir and separated therefrom by a generally horizontal wall which has an opening for conduit means, and wherein the measuring and dispensing compartment has a dispensing opening located over the conduit means opening, an improved conduit means insertable through the dispensing opening for transferring liquid from the lower to the upper compartment, said conduit means comprising a generally vertical spout having a larger diameter skirt at its lower end portion adapted to fit snugly the conduit means opening, and an elongated tube freely movable through the conduit means opening and connected to the spout within its skirt to project downwardly into the reservoir, and the spout being formed with a discharge opening directed toward the side at the upper end thereof to prevent liquid being sprayed through the dispensing opening when the walls of the reservoir are squeezed to transfer liquid therefrom to the measuring and dispensing compartment.

4. An improved conduit means for a dispensing container as set forth in claim 3 wherein said spout has a shoulder at the top of its skirt to engage the horizontal separating wall, and it also has a vertical internal bead extending downwardly to a point adjacent its skirt, and wherein the elongated tube is adapted to fit within the lower end portion of the spout and to slide upwardly therein into engagement with the lower end of the bead.

5. A container for dispensing measured quantities of different liquids and comprising an integral multi-compartment body formed of flexible wall molded material, two of the said compartments being reservoirs and being formed with a common generally vertical separating wall, and at least one other compartment defining a measuring and dispensing chamber formed over the reservoir compartments and having a common generally horizontal separating wall therewith which is provided with an opening on each side of the vertical separating wall for communication with the reservoir compartments, the said vertical and horizontal separating walls being provided with deep generally vertical and horizontal grooves, respectively, which extend from opposite sides of the container body so that the two reservoir compartments are joined by a generally vertical web and the said two reservoir compartments are joined to the measuring and dispensing compartment by a generally horizontal web, the said measuring and dispensing compartment being formed with a wall which has a dispensing opening adapted to be closed by a cap, and conduit means extending through each opening in the horizontal separating wall for transferring liquid independently from each reservoir into the associated measuring and dispensing chamber by squeezing the body walls defining the reservoirs, whereby the transferred liquid can thereafter be dispensed from the measuring and dispensing chamber.

6. A container for dispensing measured quantities of different liquids and comprising an integral multi-compartment body formed of flexible wall molded material, two of the said compartments being reservoirs and being formed with a common generally vertical separating wall, and at least one other compartment defining a measuring and dispensing chamber formed over the reservoir compartments and having a common generally horizontal separating wall therewith which is provided with an opening on each side of the vertical separating wall for communication with the reservoir compartments, the said measuring and dispensing compartment being formed with a wall which has a dispensing opening adapted to be closed by a cap, conduit means extending through each opening in the horizontal separating wall including a transfer spout extending upwardly in the associated measuring and dispensing chamber and having a discharge opening at its upper end portion, whereby liquid can be transferred from the reservoirs to the measuring and dispensing chamber while the container is in an erect position by squeezing the body walls defining the reservoirs, the molded material being sufficiently light-transmitting to permit observation of the liquid levels in all of said compartments, and multiple indicia being provided on a wall of said measuring and dispensing compartment to determine the quantity of liquid therein by reference of the liquid level to said indicia prior to dispensing the same from said measuring and dispensing chamber.

7. A container for dispensing measured quantities of different liquids and comprising a flexible wall body formed of molded material into at least four integral compartments, there being a generally vertical and a generally horizontal separating wall extending through the full length and width, respectively, of the container and defining two lower reservoir compartments and two upper measuring and dispensing compartments, one such reservoir and one such measuring compartment being associated with each other on each side of the vertical separating wall, the horizontal separating wall being provided with an opening on each side of the vertical separating wall to provide communication between the associated reservoirs and measuring and dispensing compartments, and the said vertical and horizontal separating walls being provided with deep generally vertical and horizontal grooves, respectively, which extend from opposite sides of the container body so that the compartments on opposite sides of the vertical and horizontal separating walls are joined by generally vertical and horizontal webs respectively, each of the measuring and dispensing compartments having a top wall provided with a dispensing opening adjacent the vertical separating wall and the dispensing openings being adapted to be closed by a single cap, and conduit means extending through each opening in the horizontal separating wall for transferring liquid independently from each reservoir to its associated measuring and dispensing compartment by squeezing the body walls defining the reservoirs, whereby the transferred liquid can thereafter be dispensed from the measuring and dispensing compartments.

8. A container for dispensing measured quantities of different liquids and comprising a flexible wall body formed of molded material into at least four integral compartments, there being a generally vertical and a generally horizontal separating wall extending through the full length and width, respectively, of the container and defining two lower reservoir compartments and two upper measuring and dispensing compartments, one such reservoir and one such measuring compartment being associated with each other on each side of the vertical separating wall, the horizontal separating wall being provided with an opening on each side of the vertical separating wall to provide communication between the associated reservoirs and measuring and dispensing compartments, each of the said measuring and dispensing compartments having a top wall provided with a dispensing opening adjacent the vertical separating wall and the dispensing openings being adapted to be closed by a single cap, conduit means extending through each opening in the horizontal separating wall including a transfer spout extending upwardly in the associated measuring and dispensing chamber and having a discharge opening at its upper end portion, whereby liquid can be transferred from each reservoir to its associated measuring and dispensing compartment while the container is erect by squeezing the body walls of said reservoir, the molded material being sufficiently light-transmitting to permit observation of the liquid levels in all of said compartments, and multiple indicia being provided on a wall of each measuring and dispensing compartment to determine the quantity of liquid therein by reference of the liquid level to said indicia.

9. A container comprising a unitary body including as integrally formed components a first chamber-defining compartment, a second chamber-defining compartment, and wall means between said first and second chamber-defining compartments having an opening therethrough; and conduit means extending through said opening and having a material receiving end in said first chamber and a material discharging end in said second chamber which extends axially substantially beyond said wall means and includes means for deflecting material flowing through said conduit means generally transversely; said second chamber-defining compartment having wall portions which are spaced transversely outwardly from said material discharge end including a material deflecting portion generally facing said wall means.

10. A container as defined in claim 9 wherein closure securing means is integrally formed on the second chamber-defining compartment.

11. In a dispensing container of the type having integrally formed flexible walls defining at least one reservoir and at least one measuring and dispensing compartment over the reservoir and which is separated therefrom by a generally horizontal wall having a substantial opening for filling the reservoir, and wherein the container has a top dispensing opening for the measuring and dispensing compartment, an improved conduit means insertable through the dispensing opening after the reservoir is filled for transferring liquid from the reservoir to the measuring and dispensing compartment, said conduit means having a diametrically enlarged portion snugly fitting said substantial opening in said horizontal wall and also having downwardly and upwardly projecting tubular extensions which respectively provide an inlet for receiving liquid in the reservoir and a spout for discharging the liquid in the measuring and dispensing compartment, the said spout extension being formed with a discharge opening directed toward the side at the upper end thereof to prevent liquid being sprayed through the dispensing opening when the walls of the reservoir are squeezed to transfer liquid therefrom to the measuring and dispensing compartment.

References Cited
UNITED STATES PATENTS

| | | | |
|---|---|---|---|
| 2,876,935 | 3/1959 | Lindberg | 222—207 |
| 2,985,343 | 5/1961 | Mask | 222—158 |
| 3,197,071 | 7/1965 | Kuster | 222—94 |
| 3,246,807 | 4/1966 | Micallef | 222—207 |

FOREIGN PATENTS 110,059   8/1960   Pakistan.

ROBERT B. REEVES, *Primary Examiner.*

HADD S. LANE, *Examiner.*